United States Patent [19]
Tzidon et al.

[11] Patent Number: 5,886,747
[45] Date of Patent: Mar. 23, 1999

[54] PROMPTING GUIDE FOR CHROMA KEYING

[75] Inventors: Aviv Tzidon, Azur; Dekel Tzidon, Ramat Hagolan, both of Israel

[73] Assignee: RT-SET, Herzelia, Israel

[21] Appl. No.: 595,311

[22] Filed: Feb. 1, 1996

[51] Int. Cl.$^6$ .................................................. H04N 9/75
[52] U.S. Cl. ..................... 348/587; 348/592; 348/722; 348/552
[58] Field of Search ...................... 348/510, 511, 348/512, 513, 514, 516, 584, 586, 587, 590, 592, 591, 598, 744, 759, 760, 585, 722, 552; 345/9, 114, 158; H04N 9/75

[56] References Cited

U.S. PATENT DOCUMENTS

| | | | |
|---|---|---|---|
| 3,898,377 | 8/1975 | Fairbairn et al. | 348/510 |
| 3,986,204 | 10/1976 | Smith | 348/587 |
| 4,811,084 | 3/1989 | Belmares-Sarabia et al. | 348/592 |
| 5,313,275 | 5/1994 | Daly et al. | 348/592 |
| 5,477,282 | 12/1995 | Moore | 352/4 |
| 5,500,684 | 3/1996 | Uya | 348/592 |

*Primary Examiner*—Sherrie Hsia
*Attorney, Agent, or Firm*—Schwegman, Lundberg, Woessner & Kluth, P.A.

[57] ABSTRACT

A method and apparatus is described where the coordinates of the main objects of a video studio set are placed in a computer and special markings are projected or screened on the floor or on the studio walls in real time. This enables an actor to easily find his way around the set, and to focus his gaze on the virtual objects appearing in or disappearing from the studio. The present invention gives the actor the timings for various events taking place in the studio. The special markings are completely invisible to the camera and to the home viewers because they are only active during virtual blanks of the camera such as the vertical blanking interval or the horizontal blanking interval in an NTSC, PAL, SECAM or other video signal format.

15 Claims, 2 Drawing Sheets

PROMPTING GUIDE FOR CHROMA KEYING

FIELD OF THE INVENTION

The present invention pertains generally to studio prompting and in particular to systems which makes chroma key studios and virtual sets more tangible, thereby making it easier for the actor to find his place within the blue screen environment.

BACKGROUND OF THE INVENTION

Chroma-keying and virtual set technology enable the actor in the studio to appear as if he is in a more complex environment. Using this technology, scenes comprised of a number of sources, such as live video and computer graphics can be created and combined together.

In many television programs which are broadcast from television studios, live video is combined with backgrounds which were prepared in advance. This technology is called "chroma-key". The backgrounds used in this technology can be still photographs, videotape or any other picture.

The actor (the newscaster, weather forecaster, etc.) stands in front of a plain blue screen in the studio. The television camera shoots both the actor (live video) and the blue screen. The resulting picture is then transferred to a chroma-keyer, for processing. At the same time, a background picture from a different source (such as another camera, pre-taped video or computer graphics) is transferred to the chroma-keyer.

Both pictures, the live and the background picture, are combined in the chroma-keyer and broadcast as one picture which shows the live video on the background. For example, the final result can be a weather-forecaster standing in front of a weather map which cannot be seen at all in the physical studio.

The chroma-keyer can differentiate between the live video and the blue background, according to the pixels. Wherever a pixel from the live video is identified, it is transferred to the combined broadcast picture. Wherever a pixel from the blue screen is identified, the appropriate pixel from the background is placed into the broadcast picture. In this way, a new picture is created and broadcast, using the background which was chosen.

In the above technology, the actor finds himself in a virtual space, which he does not actually see during shooting of the scene. The actor must therefore imagine the set and practice long hours in order to point in the right direction or avoid walking into virtual walls, people and other objects which are part of the set.

There are two ways currently used to help the actor find his way around within the set. Because neither of the solutions is perfect, the two are usually combined together:

1. Marking the places of objects and of the actor himself on the floor with masking tape. This solution is problematic in scenes which are comprised of a number of sets and for scenes in which the integrated object is in movement.
2. A monitor which displays the integrated picture for the actor. This solution causes the actor to focus his gaze on places which are not necessarily part of the scene. For example, the weather forecaster may need to point to a map on the wall in back of him, but in order to see the feedback on the monitor regarding the location of his finger, he is required to look straight ahead.

There are also a number of techniques which enable the actor to find his place so that he can react in time to various events:

1. A flash of light which is synchronized with the cameras.
2. Sounds to signify events.

SUMMARY OF THE INVENTION

The present invention is a method and apparatus whereby the main objects of the set and special markings will be projected or screened on the floor or on the studio walls in real time. This will enable the actor to easily find his way around the set, and to focus his gaze on the virtual objects appearing in or disappearing from the studio. The present invention gives the actor the timings for various events taking place in the studio. The special markings are completely invisible to the camera and to the home viewers because they are only active during blanking intervals of the video camera signal such as the vertical blanking interval or the horizontal blanking interval in an NTSC, PAL, SECAM or other video signal format.

BRIEF DESCRIPTION OF THE DRAWINGS

In the drawings, where like numerals refer to like components throughout the several views.

DETAILED DESCRIPTION OF THE INVENTION

Figure 1:
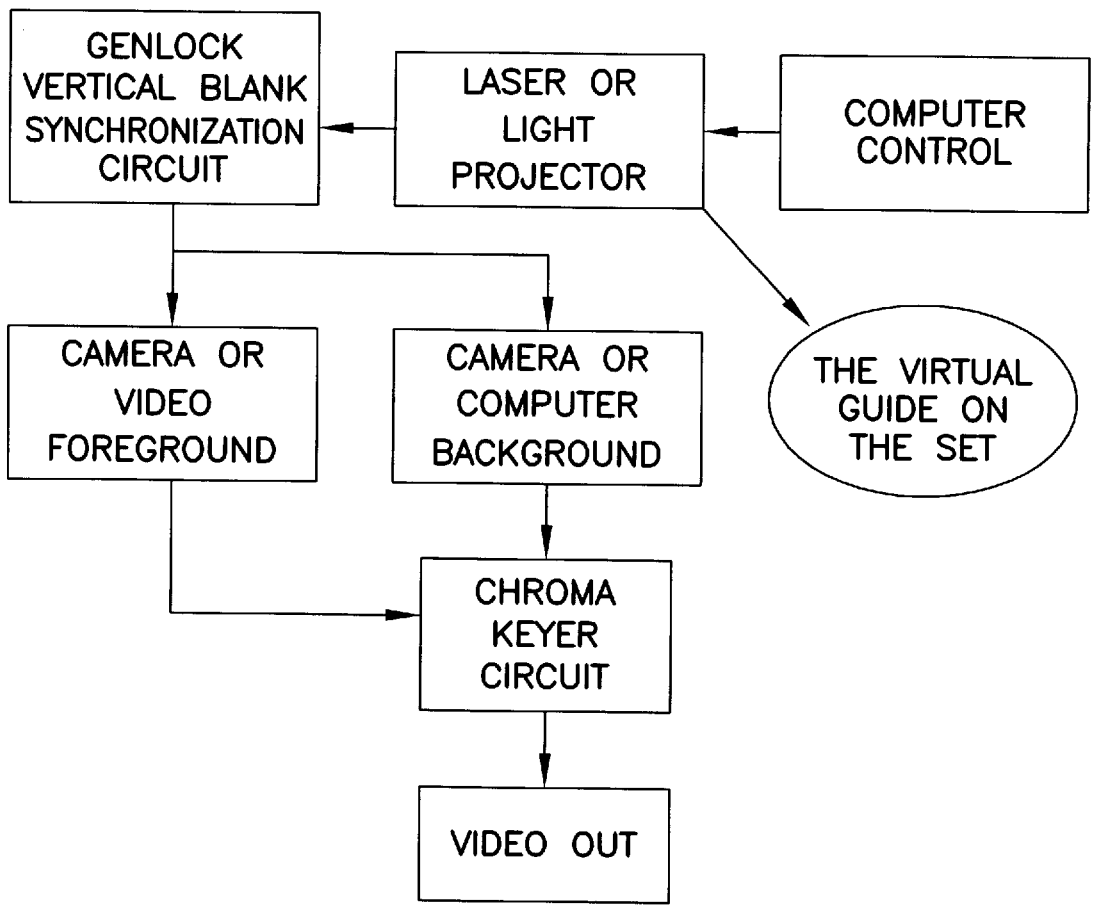
FIG. 1 shows the system block diagram and process flow.

In the following detailed description of the preferred embodiment, references made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes may be made without departing from the spirit and scope of the present invention. The following detailed description is, therefore, not to be taken in a limiting sense, and the scope of the present invention is defined only by the appended claims and their equivalents.

The present invention is directed to a novel design for a method and apparatus to project the main objects of the virtual set in a chroma keying environment for prompting actors with audio or visual cues. Special markings are projected or screened on to the floor or on the studio walls in real time. This enables the actor to easily find his or her way around the virtual set, and to focus his or her gaze on the virtual objects appearing in or disappearing from the studio. The present invention also gives the actor the timings for various events taking place in the studio. The special markings are completely invisible to the camera and to the home viewers because they are only active during blanking intervals of the video camera signals such as the vertical blanking interval or the horizontal blanking interval in an NTSC, PAL, SECAM or other video signal format. Those skilled in the art will readily recognize that the horizontal blanking and vertical blanking intervals of a television signal correspond to the retrace period for the video or television CRT in which the electron beam is repositioned to begin tracing a new line or a new field, respectively. The blanking interval is also known as the retrace time.

The method consists of first creation of the virtual scene on a computer. The prompting guide for chroma keying is used to create a virtual set on a computer using a sketch of the set and the important objects in it. The places where the actor must be found at various times are indicated in the computer model.

In use, the places where the actor must place himself at various times are projected on the floor or wall by use of a small arrow or other indicator that shows the actions about to take place. Another sign which indicates where the actor should focus his gaze (in the future, this sign will also show the actor his next line of text). All of the signs can appear with the time in which the next action or event is to take place.

All of the above signs will take place relative to the database of the set stored in the computer and synchronized with the chroma keying equipment and the video studio master synchronization signal. Transformations for the coordinates of the movable projector which projects this data on the studio walls and floor are made in order to fix the distortions which take place on the picture as a result of putting it on real objects in the studio.

The feedback to the actor that the present invention provides can be screened in the studio with the help of a projector and video or with the help of a laser light that is controlled by the computer. In addition, it will be possible to make this picture hidden from the viewer by the fact that the shooting will take place in full sync with the Time Code of the cameras or by the use of chroma-key colors.

TABLE 1

Time Calculations (PAL)

| | |
|---|---|
| Line Blanking | 4.7 + 11.5 [μsec] |
| Line period | 63.5 |
| Field blanking | 25 lines + 1 line blanking 1.6 [msec] |
| Number of fields per second | 25 |

Table 1 shows some of the timing constraints for a PAL video signal in which the video prompts are projected within the blanking intervals. High resolution laser can draw approximately 100 dots in one frame, which is enough for either small animations at different locations on the set or much larger static drawings.

FIG. 1 shows the system block diagram A Genlock device is used to synchronize the components to a common video signal timing. All studio cameras are synchronized to the Genlock as well as the laser or light projector. The computer generates the prompts that the projector will display or flash during the blanking interval. The foreground and background video sources are combined by the chroma keyer to produce the composite video. The resulting video will not show the prompting from the projector since the prompting only appeared during the blanking intervals. The latency of the human eye allows the actors on the set to see the flashing prompts, but the video equipment does not contain such latency so the prompts will not be picked up.

Figure 2:
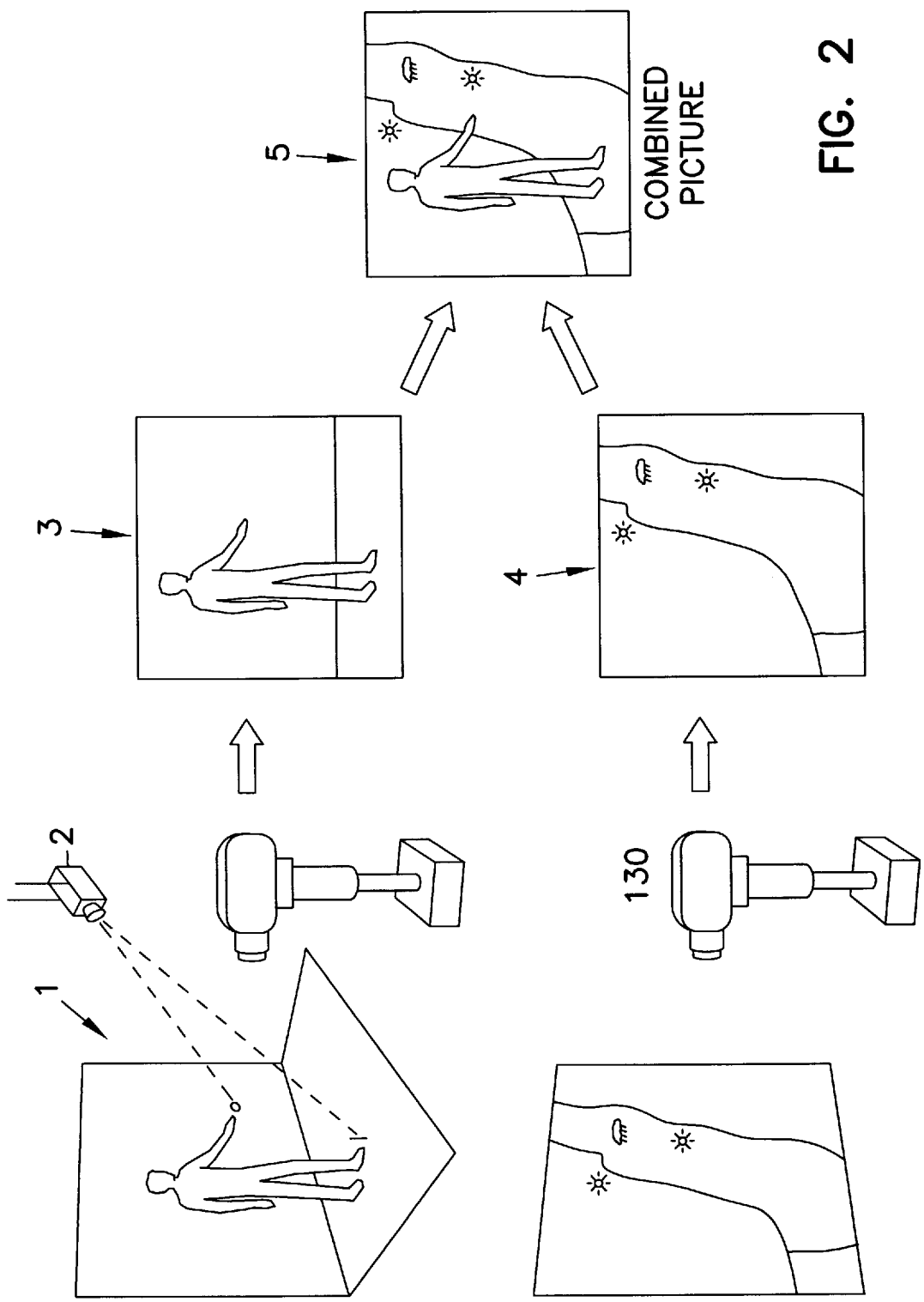
FIG. 2 shows use of the present invention in a blue-screen studio environment.

FIG. 2 shows a typical blue-screen chroma key set typically used for reporting the weather on television. The actor stands before a blue screen in (1) and the prompting device (2) projects prompting images onto the floor and onto the blue screen to tell the weatherman where to stand and point. The video camera picks up the image (3) but the foreground image (3) does not contain the prompts. The second background video image of a map is picked up by a second video camera to produce a background image (4) which is combined with the foreground image to produce the composite video image devoid of any prompting images.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A system for directing an actor in a chroma key blue screen environment, comprising:
   a computer having a model of a TV studio set stored therein;
   a synchronization circuit connected to a video camera having a video signal and connected to a projector; and
   the projector connected to the computer for projecting images during the blanking interval of the video signal.

2. The system of claim 1 where the projector is a laser.

3. The system of claim 1 where the projector projects images onto the TV studio set.

4. A method of prompting an actor in a TV studio set comprising the steps of:
   programming a computer with a description of a studio set;
   synchronizing the computer to a video signal; and
   prompting the actor during a blanking interval of the video signal.

5. The method according to claim 4, wherein the step of prompting further comprises the step of projecting information onto the studio set.

6. A system for directing an actor in a chroma key environment, comprising:
   a computer having a model of a TV studio set stored therein;
   a video camera having a video signal;
   a chroma keying circuit connected to the video camera; and
   a projector connected to the computer for projecting images in a chroma keying color.

7. The system of claim 6 where the projector is a laser having the chroma keying color.

8. The system of claim 6 where the projector projects chroma keying color images onto the TV studio.

9. A method of prompting an actor in a TV studio set, comprising the steps of:
   programming a computer with a description of a studio set;
   synchronizing a video camera to a prompting device; and
   prompting the actor using the prompting device only during the vertical blanking interval.

10. The method according to claim 9, wherein the step of prompting further comprises the step of projecting information onto the studio set in a chroma keying color.

11. A system for directing an actor in a chroma key environment, comprising:
   a computer having a database of coordinates of a set of prompts stored therein;
   a synchronization circuit connected to a video camera having a video signal and connected to a movable projector; and
   the movable projector connected to the computer for receiving the coordinates and in response thereto projecting the prompts during the blanking interval of the video signal.

12. A method of prompting an actor in a chroma key environment, comprising the steps of:

programming a computer with a description of prompts;

synchronizing the computer to a video signal; and projecting the prompts during a blanking interval of the video signal.

13. A system for directing an actor in a chroma key environment, comprising:

a computer having a series of prompts stored therein;

a video camera having a video signal;

a chroma keying circuit connected to the video camera; and a projector connected to the computer for projecting the prompts in a chroma keying color.

14. A method of prompting an actor in a chroma key environment, comprising the steps of:

programming a computer with a description of prompts, synchronizing a video camera to the computer; and prompting the actor with the prompts projected only during the vertical blanking interval.

15. A method of prompting an actor in a chroma key environment, comprising:

programming a computer with a description of a series of prompts to be displayed on a television studio set; and projecting the series of prompts in a chroma key color using a prompting device in chroma key environment.

* * * * *